US007975143B2

(12) United States Patent
Boyer et al.

(10) Patent No.: US 7,975,143 B2
(45) Date of Patent: Jul. 5, 2011

(54) METHOD, SYSTEM, AND PROGRAM PRODUCT FOR GENERATING AND VALIDATING DIGITAL SIGNATURES

(75) Inventors: John M. Boyer, Victoria (CA); Vladimir Trakhtenberg, Nanaimo (CA)

(73) Assignee: International Business Machines Corporation, Armonk, NY (US)

(*) Notice: Subject to any disclaimer, the term of this patent is extended or adjusted under 35 U.S.C. 154(b) by 1030 days.

(21) Appl. No.: 11/423,572

(22) Filed: Jun. 12, 2006

(65) Prior Publication Data
US 2007/0288393 A1 Dec. 13, 2007

(51) Int. Cl.
*H04L 9/32* (2006.01)
(52) U.S. Cl. ........................................ 713/176
(58) Field of Classification Search ............ 726/10; 713/176, 177
See application file for complete search history.

(56) References Cited

U.S. PATENT DOCUMENTS

| | | |
|---|---|---|
| 5,577,209 A | 11/1996 | Boyle et al. |
| 5,758,068 A | 5/1998 | Brandt et al. |
| 5,787,175 A | 7/1998 | Carter |
| 5,991,399 A | 11/1999 | Graunke et al. |
| 6,018,801 A | 1/2000 | Palage et al. |
| 6,253,326 B1 | 6/2001 | Lincke et al. |
| 6,449,721 B1 | 9/2002 | Pensak et al. |
| 6,738,077 B1 | 5/2004 | Wendker et al. |
| 6,948,133 B2 | 9/2005 | Haley |
| 7,039,871 B2 | 5/2006 | Cronk |
| 7,203,966 B2 | 4/2007 | Abburi et al. |
| 7,406,599 B1* | 7/2008 | Pravetz et al. ............... 713/176 |
| 7,430,714 B1 | 9/2008 | Savitzky et al. |
| 2002/0099938 A1* | 7/2002 | Spitz ............................. 713/155 |
| 2002/0196268 A1 | 12/2002 | Wolff et al. |
| 2004/0073511 A1 | 4/2004 | Beaumont et al. |
| 2004/0168150 A1 | 8/2004 | Ziv |
| 2005/0076215 A1* | 4/2005 | Dryer ............................. 713/170 |
| 2005/0091402 A1 | 4/2005 | Satagopan et al. |
| 2005/0278793 A1 | 12/2005 | Raley et al. |

OTHER PUBLICATIONS

State Services Commission, New Zealand E-government Interoperability Framework (NZ e-GIF), pp. 1-96, Mar. 2006.
Government of India Communications and Information Technology Department of Information Technology National Informatics Centre, "I F E G Interoperability Framework for E-Governance Technical Standards", Release May 31, 2004, pp. 1-108.
Micah Dubinko, Xform Essentials, 2003, p. 119.
Ghazal B. Shehni, "Office Action", U.S. Appl. No. 11/423,527, Notification Date Jul. 31, 2010, 12 pages.
Ghazal B. Shehni, "Final Office Action", U.S. Appl. No. 11/423,527, Notification Date Jan. 4, 2010, 10 pages.

(Continued)

*Primary Examiner* — Ellen Tran
(74) *Attorney, Agent, or Firm* — Edward Choi; Hoffman Warnick LLC

(57) ABSTRACT

Under the present invention, an electronic document is accessed. Each user interface control (UIC) in the electronic document is confirmed to be operationally classified as signed or unsigned by a given digital signature based on whether the UIC is associated with a data node that is signed by the digital signature. It is then determined whether the signed UIC is visible. A token representing a geometric location of the visible signed UIC within a visual representation of the electronic document and a relative location of the visible signed UIC to other visible signed UICs in the electronic document is then recorded. However, if the UIC is contained within any hierarchic UICs, the location thereof is first converted to the geometric location within the visual representation prior to recording the token. The digital signature can then be generated and/or validated unless a UIC overlap and/or layout violation is committed.

28 Claims, 5 Drawing Sheets

OTHER PUBLICATIONS

Ghazal B. Shehni, "Office Action", U.S. Appl. No. 11/423,527, Notification Date Aug. 23, 2010, 12 pages.
Abelson, Ronald B., "PTO Office Action", U.S. Appl. No. 11/423,485, Notification Date Oct. 13, 2010, 8 pages.
Shehni, Ghazal B., PTO Final Office Action, U.S. Appl. No. 11/423,527, 17 pages.
Ronald B. Abelson, Notice of Allowance Fee(s) Due, U.S. Appl. No. 11/423,485, Date Mailed Mar. 22, 2011, 7 pages.

* cited by examiner

FIG. 3

METHOD, SYSTEM, AND PROGRAM PRODUCT FOR GENERATING AND VALIDATING DIGITAL SIGNATURES

CROSS-REFERENCE TO RELATED APPLICATIONS

This application is related in some aspects to the commonly owned application entitled "Method, System, and Program Product For Preventing Unauthorized changes to an Electronic Document", which is assigned Ser. No. 11/423,5727, and was filed on Jun. 12, 2006, the entire contents of which are hereby incorporated by reference. This application is related in some aspects to the commonly owned application entitled "Capturing user Interface Switch States", which is assigned Ser. No. 11/423,485, and was filed on Jun. 12, 2006, the entire contents of which are hereby incorporated by reference.

BACKGROUND OF THE INVENTION

1. Field of the Invention

The present invention generally relates to digital signature generation and validation. Specifically, the present invention relates to a method, system, program product, and method for deploying an application for generating and/or validating digital signatures.

2. Related Art

Many electronic documents involve the use of more than one digital signature. Although the simplest use cases are well known, such as the ubiquitous office-use-only section or the applicant/co-applicant loan application, some forms can involve many overlapping signatures affixed after each signatory performs additional work on the form. For example, an application for the Office of the Secretary of Defense for approving military SOP changes involves as many as 50 signatures, where each signer would add additional annotations related to the SOP change. To allow for additional work to be performed on a form after a signature has been affixed, the notion of an Extensible Markup language (XML) digital signature filter was defined. The filter typically expresses what part of the document to exclude from the signature. Everything not explicitly mentioned by the exclusion filter is covered by the signature, so the filter becomes a description of what additional work is allowed to be performed on the form without invalidating the signature. The signature filter is associated with the signature, and it is signed by the signature. This allows each signature to have its own filter and allows only a certain amount and type of work to be done on the form after that signature is affixed. Of course, each signature typically allows a diminishing set of additional work to be done leading up to the full completion of the form.

Unfortunately, due to drawbacks with existing filter mechanisms, a pair of tests called the User Interface Control (UIC) overlap test and the UIC layout test have been developed. These tests are augmentations to the core cryptographic sign and validate operations. Specifically, each UIC of the electronic document, or item, is associated with a rectangular bounding box corresponding to its draw area. The UIC overlap test for a signature determines whether any UIC that is signed by the signature overlaps the bounding box of any unsigned item. The UIC layout test has a similar purpose to the UIC overlap test, except that it seeks to prevent obscuring or un-obscuring of signed items by other signed items.

The current methods of partial document signing encourage partial document signatures to not secure the entire presentation layer by equating exclusion of the markup of a UIC with exclusion of the data. This decreases security because additional user interface elements can be added directly to the presentation markup without invalidating a signature. Moreover, given a system in which exclusions are made only to data and the entire presentation layer markup is signed, changes to the actual presentation can still occur based on how allowable data changes are interpreted by the user interface definition. As a result, modifications (malicious or otherwise) to data can still cause undesired overlaps of user interface controls, either due to the creation or deletion of controls based on data changes as well as changes of size of controls due to data changes. In addition, the UIC overlap and layout tests are also not defined for user interface definitions that contain hierarchic UICs.

In view of the foregoing, there exists a need for a solution that solves at least one of the deficiencies in the related art.

SUMMARY OF THE INVENTION

In general, the present invention provides a method, system, and program product for generating and validating digital signatures. Specifically, under the present invention, an electronic document having at least one user interface control (UIC), and optionally at least one hierarchic UIC is accessed. For each UIC, it will then be confirmed whether the UIC is operationally classified as signed by the digital signature based not on whether its markup is directly signed but rather on whether or not the UIC is associated with a data node that is included in the signed material of the digital signature. It is then determined for each signed UIC, whether the signed UIC is visible by combining local visibility information with visibility information of any hierarchic UIC containing the UIC. A layout token representing a geometric size of each visible signed UIC within a visual representation of the electronic document and a relative location of the UIC to other visible signed UICs in the electronic document is then recorded within a cryptographically protected portion of the digital signature. However, if the UIC is contained within a hierarchic UIC, the location of the UIC will first be converted from a geometric location within the hierarchic UIC to the geometric location within the visual representation prior to recording the token.

In any event, the digital signature will then be generated unless a UIC overlap violation is committed. A UIC overlap violation includes one signed UIC and one unsigned UIC for which: the signed UIC is not a hierarchic UIC or the unsigned UIC is not part of the signed hierarchic UIC; and the geometric regions on the visual representation occupied by the signed UIC and the unsigned UIC intersect by more than a predetermined overlap tolerance.

The present invention also validates digital signatures by determining whether any signed or unsigned UIC commits either a UIC layout violation or a UIC overlap violation. To determine if a UIC layout violation is committed a validation token is generated in the same manner as the layout token and then compared to the layout token to determine if a predetermined layout tolerance is exceeded. A UIC layout violation is also committed if a switch hierarchic UIC of the electronic document changes cases after generation of the digital signature, except for switches that are deemed mutable by notations in the electronic document or the digital signature.

A first aspect of invention provides a method for generating digital signatures, comprising: accessing an electronic document having at least one user interface control (UIC); confirming, for each UIC, whether the UIC is operationally classified as signed by a digital signature being generated based on whether the UIC is associated with a data node that is included in the signed material of the signature; determining, for each signed UIC, whether the UIC is visible by combining local visibility information with visibility information of any hierarchic UIC containing the UIC; recording within a cryptographically protected portion of the digital signature a layout token representing a geometric size of each visible signed UIC within a visual representation of the electronic document and a location of each visible signed UIC relative to other visible signed UICs in the electronic document; and generating the digital signature unless a UIC overlap violation is committed.

A second aspect of the invention provides a system for generating digital signatures, comprising: a system for accessing an electronic document having at least one user interface control (UIC); a system for confirming, for each UIC, whether the UIC is operationally classified as signed by a digital signature being generated based on whether the UIC is associated with a data node that is included in the signed material of the signature; a system for determining, for each signed UIC, whether the UIC is visible by combining local visibility information with visibility information of any hierarchic UIC containing the UIC; a system for recording within a cryptographically protected portion of the digital signature a layout token representing a geometric size of each visible signed UIC within a visual representation of the electronic document and a location of each visible signed UIC relative to other visible signed UICs in the electronic document; and a system for generating the digital signature unless a UIC overlap violation is committed.

A third aspect of the invention provides a program product stored on a computer readable medium for generating digital signatures, the computer readable medium comprising computer program code for causing a computer system to perform the following functions: accessing an electronic document having at least one user interface control (UIC); confirming, for each UIC, whether the UIC is operationally classified as signed by a digital signature being generated based on whether the UIC is associated with a data node that is included in the signed material of the signature; determining, for each signed UIC, whether the UIC is visible by combining local visibility information with visibility information of any hierarchic UIC containing the UIC; recording within a cryptographically protected portion of the digital signature a layout token representing a geometric size of each visible signed UIC within a visual representation of the electronic document and a location of each visible signed UIC relative to other visible signed UICs in the electronic document; and generating the digital signature unless a UIC overlap violation is committed.

A fourth aspect of invention provides a method for deploying a system for generating digital signatures, comprising: providing a computer infrastructure being operable to: access an electronic document having at least one user interface control (UIC); confirm, for each UIC, whether the UIC is operationally classified as signed by a digital signature being generated based on whether the UIC is associated with a data node that is included in the signed material of the signature; determine, for each signed UIC, whether the UIC is visible by combining local visibility information with visibility information of any hierarchic UIC containing the UIC; record within a cryptographically protected portion of the digital signature a layout token representing a geometric size of each visible signed UIC within a visual representation of the electronic document and a location of each visible signed UIC relative to other visible signed UICs in the electronic document; and generate the digital signature unless a UIC overlap violation is committed.

Therefore, the present invention provides a method, system, program product, and method for deploying an application for generating and validating digital signatures.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an illustrative electronic document having user interface controls (UICs) according to the present invention.

DETAILED DESCRIPTION OF THE INVENTION

Figure 1:
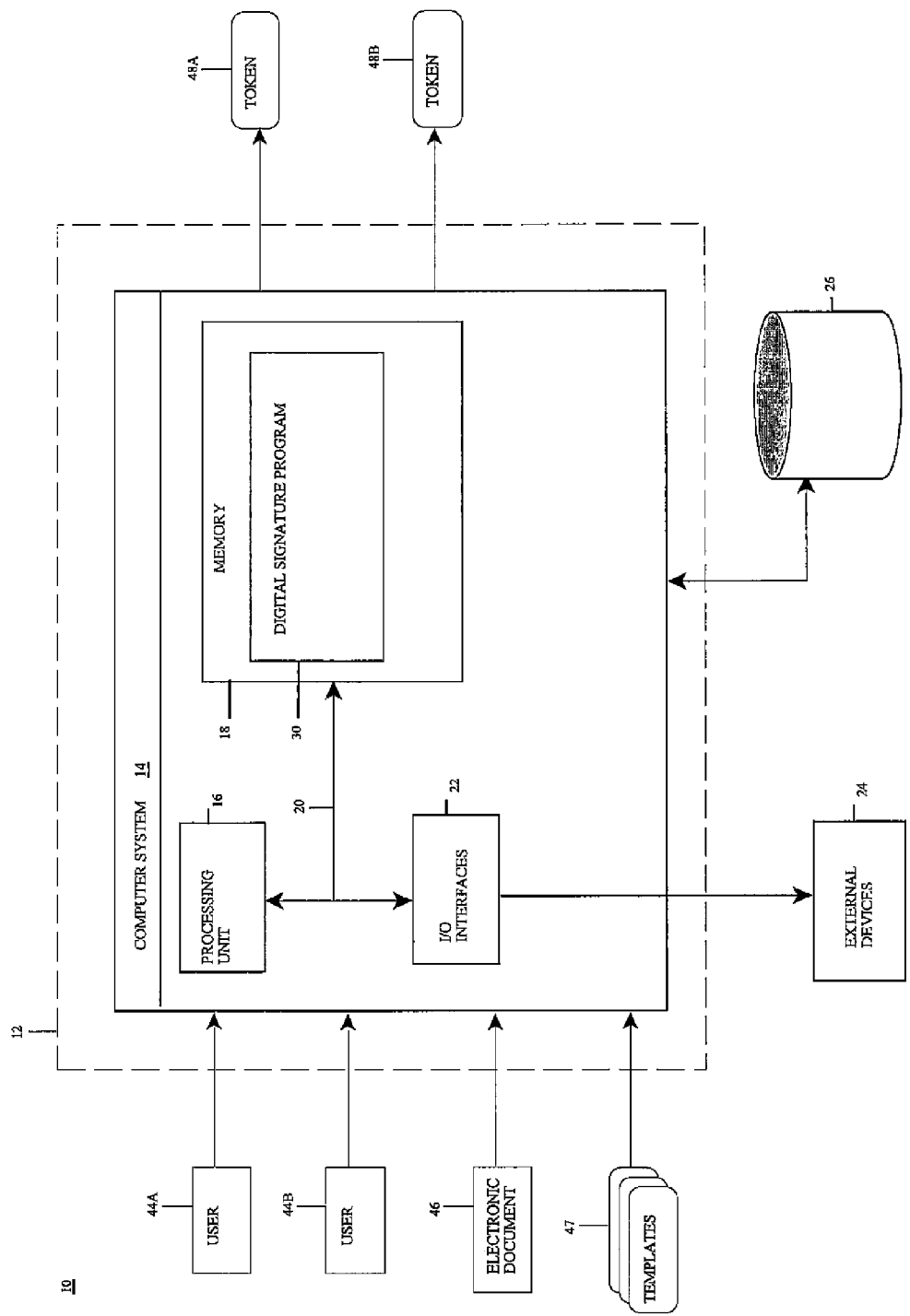
FIG. 1 depicts a system for generating and validating digital signatures according to the present invention.

For convenience purposes, the Detailed Description of the Invention has the following sections:
I. General Description
II. Computerized Implementation
I. General Description As mentioned above, existing methods of partial document signing encourage partial document signatures not to secure the entire presentation layer since exclusion of data that must be manipulated after signing is performed by exclusion of the UIC for manipulating the data. This decreases security because additional UICs can be added directly to the presentation markup without invalidating a signature. Moreover, given a system in which exclusions are made only to data and the entire presentation layer markup is signed, changes to the actual presentation can still occur based on how allowable data changes are interpreted by the user interface definition. As a result, modifications to data can still cause undesired overlaps of UICs, either due to the creation or deletion of UICs based on data changes as well as changes of size of UICs due to data changes. Therefore, the present invention provides a new technique for the union of the new signing architecture with the UIC overlap and layout tests.

The overlap and layout tests were also not defined for user interface definitions that contained hierarchic structure. Under the present invention, the overlap test has been extended to account for overlaps that cross UI containment boundaries. The layout test is also extended to solve the problem of detecting whether a dynamically switchable container control or an iterator container control has been changed to a different layout of controls.

Under the prior implementation of the overlap and layout tests, a UIC is determined to be signed by a given signature based on whether the XML describing the UIC was signed by that signature. Under the present invention, the layout and overlap tests have been adapted to allow them to operationally classify an item as unsigned by a signature even if the XML markup for the item is signed by the signature. In general, this allows all of the presentation and logic of an electronic document to be signed while omitting some of the data. If one omits all of the data, then the signature is essentially an instance of application signing. The present invention thus provides an "author-friendly" method of document presentation/logic signing that is compatible with layout and overlap testing augmentations on signatures.

More generally, the present invention provides a technique in which a signature can keep only some of the data, all of the presentation layer markup, and still preserve the additional security offered by the original layout and overlap tests. To this extent, the present invention provides, among others, the following features:

(1) For an iterator container control (such as xforms repeat), the UIC that encloses the repeated content is considered signed if and only if the set of nodes for which UICs are iterated is non empty, and the element containing the set of nodes is included in the signed data. It is important to provide this definition for signed item associated with an iterator container control because it ensures that the visual effect of a table cannot be made to surround additional items associated with data that is allowed (by the signature filter) to be unsigned. This would cause the user to think that these additional items are associated with the signed data.

(2) For an item that has a user interface binding to an XML data node, the UICs are considered signed if and only if the bound XML node is included in the signed data. This definition allows controls to be classified as unsigned based on association with unsigned data even though the markup for the control may be completely signed.

(3) For an item that does not have a user interface binding to an XML data node (either because no binding is expressed or because the expressed binding does not resolve to a node), the item is considered signed if and only if the context node is included in the signed data. The context node is the starting node that would be used to evaluate a user interface binding if there were one. This definition allows both container controls and atomic controls that are not bound to data to inherit a signed or unsigned context from a container control. This addresses the following problems:

(i) it allows items that provide simple graphic effects (line, box, image label) to participate in the layout and overlap tests based on the signature context of the surrounding context despite having their full markup signed. This is important because these simple effects cannot be associated with data.

(ii) some atomic UICs such as triggers (buttons) and container controls are able to express a UI binding to data but often do not. In this latter case, the UICs are still able to participate appropriately in the layout/overlap test due to inheriting signature status from the context.

(iii) this allows "subatomic" controls (like checks and radios generated for a check group or radio group) to be included in overlap and layout tests even though they are only part of a larger single control.

Still further, the UIC overlap and layout tests have been adjusted under the present invention in several additional ways to further accommodate security needs of a hierarchic user interface definition. Specifically:

(1) The layout test is adjusted to disallow signed items in one container control from obscuring or un-obscuring signed items in a separate container. This is by calculating the layout descriptor string using the absolute positions of all signed items against the underlying drawing canvas. Usually, contained UICs are positioned relative to the origin of the container.

(2) We adjust the overlap test to say that an unsigned item can overlap a signed container control if and only if the signed container is an ancestor container of the unsigned control. This leverages the containment knowledge stored in the UI markup into the overlap test. The prior language did not store UI containment knowledge, so the prior overlap test did not consume such information.

(3) The layout test detects the obscuring or un-obscuring of a signed item A by a signed item B based on either a change of position or change of visibility of B. The visibility test under the present invention accounts for containing UICs' visibility.

(4) The present invention also locks down layout of a signed switch (preservation of selected cases with an optional state attribute is also provided this allows regeneration of the correct case; the layout test is what defines whether the case layout is modified since signing, which can occur if, for example, the state data node is left unsigned).

II. Computerized Implementation

Referring now to FIG. 1, a more detailed diagram of a computerized implementation 10 of the present invention is shown. As depicted, implementation 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of implementation 10 could be deployed, managed, serviced, etc. by a service provider who offers to implement and/or perform the functions of the present invention for others.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as digital signature program, which is stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server.

Similarly, memory 18 and/or storage system 26 can comprise any combination of various types of data storage and/or transmission media that reside at one or more physical locations. Further, I/O interfaces 22 can comprise any system for exchanging information with one or more external interfaces 24. Still further, it is understood that one or more additional components (e.g., system software, math co-processing unit, etc.) not shown in FIG. 1 can be included in computer system 14. However, if computer system 14 comprises a handheld device or the like, it is understood that one or more external interfaces 24 (e.g., a display) and/or storage system 26 could be contained within computer system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown). In addition, although not shown, additional components, such as cache memory, communication systems, system software, etc., may be incorporated into computer system 14.

Figure 2:
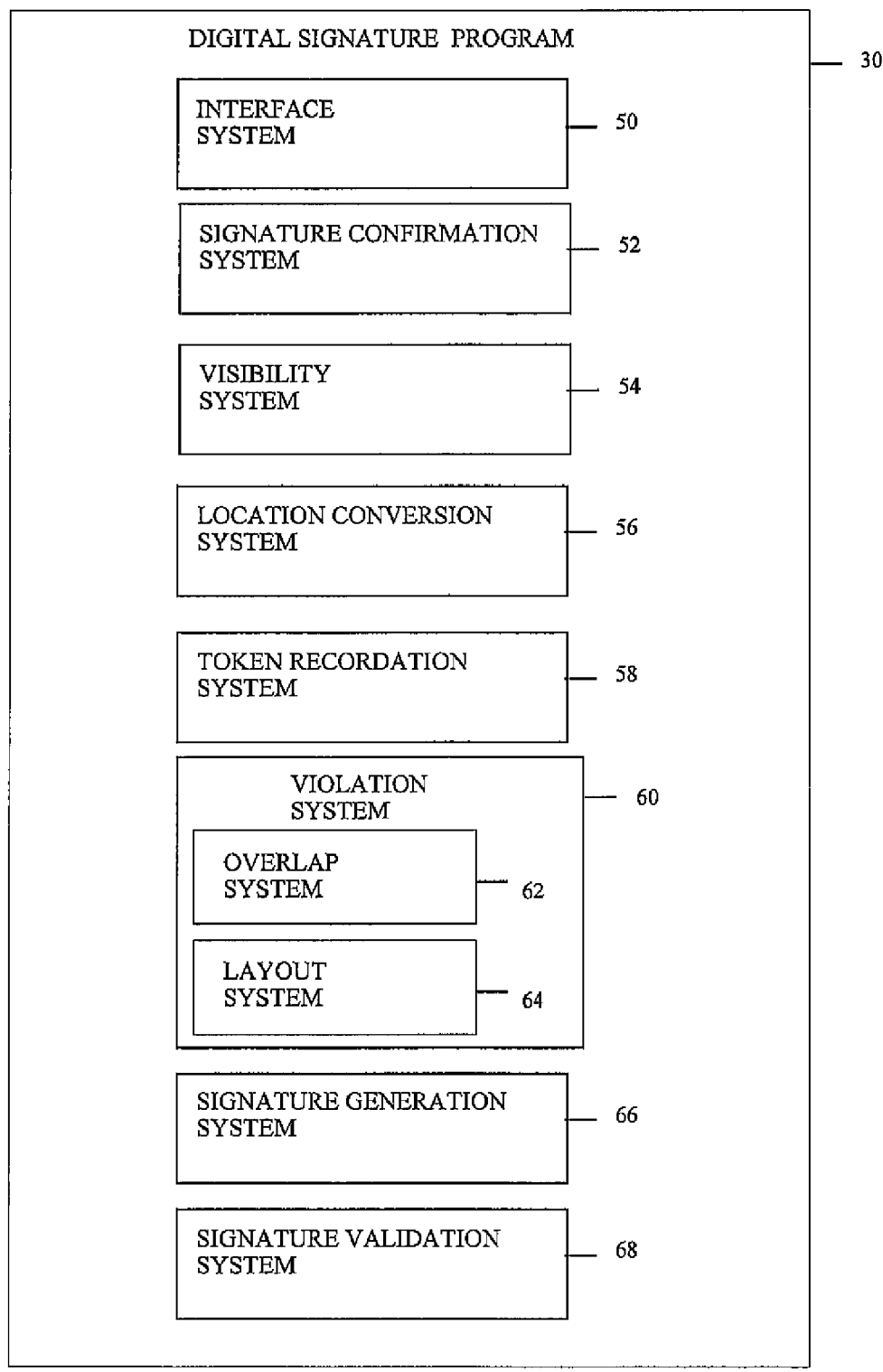
FIG. 2 depicts the digital signature program of FIG. 1 in greater detail.

Shown in memory 18 of computer system 14 is digital signature program 30, which is adapted to generate and validate digital signatures according to the present invention. Referring to FIGS. 1 and 2 collectively, the components and functions provided by digital signature program 30 will be described in greater detail. Specifically, under the present invention, interface system 50 is adapted to receive or otherwise obtain an electronic document 46 as well as any presentation layer template(s) 47 therefore. Interface system 50 is also adapted to render electronic document 46 (e.g., using templates 47) for display to users 44A-B.

Figure 3:
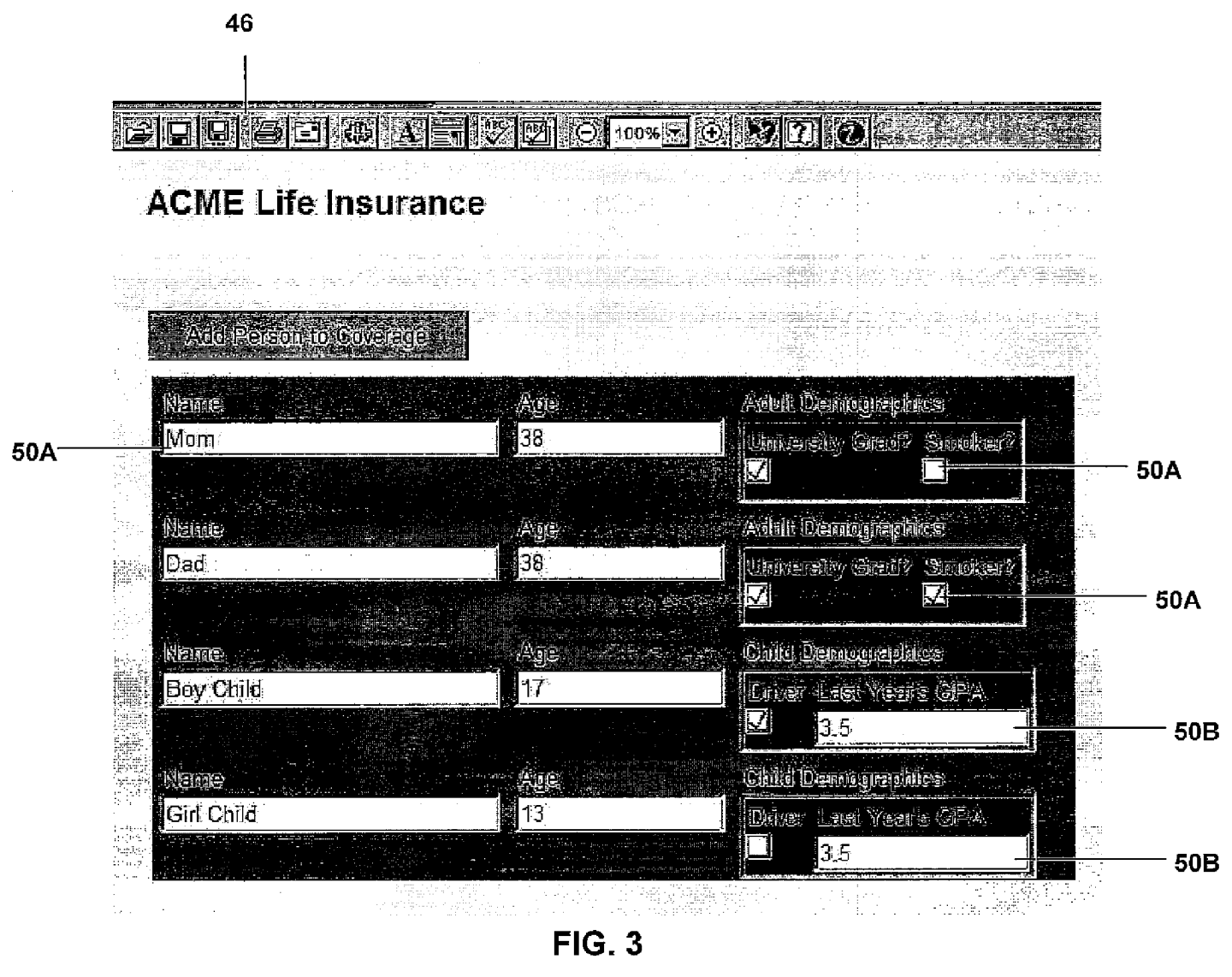

Referring briefly to FIG. 3, electronic document 46 as displayed to users 44A-B is shown in greater detail. As depicted, electronic document 46 (e.g., as displayed) typically includes a set (i.e., at least one) of UICs 50A-N such as field(s) 50A, radio box(es) 50B, button(s) 50C, etc. UICs 50A-N are typically associated with data underlying the actual electronic document 46. Along these lines, a single UIC 50A-N could be associated with a single data item or a group of data items. For example, a name field UIC 50A could be associated with a single data item such "Mom". Alternatively, an adult demographic UIC 50N could be associated with multiple data items such as the whether the corresponding adult is a "University Graduate" and/or a "Smoker". The latter of these two is referred to as a hierarchic UIC 50N that contains one or more individual UICs 50B. Under previous embodiments, UIC 50N was realized as simply a border or background box for UICs 50B. However, recent technology has enabled UICs 50N to be realized as true hierarchical structures wherein UICs 50B would be considered children of hierarchic UIC 50N.

Referring back to FIGS. 1 and 2 collectively, when electronic document 46 is received, signature confirmation system 52 will confirm for each UIC 50A-N, whether the UIC is operationally classified as signed by the digital signature being generated based on whether or not the UIC is associated with a data node that is included in the signed material of the signature by user 44A. Under previous embodiments, the signature of the data was not considered, only the XML of the actual UIC 50B. In any event, visibility system 54 will then determine (for each signed UIC (e.g., 50B) whether the signed UIC(s) are visible by combining local visibility information with visibility information of any hierarchic UIC 50N containing the UIC. For example, if a signature of UIC 50B is being generated and validated, visibility information of hierarchic UIC 50N will be considered. Thereafter, token recordation system 58 will record, within a cryptographically protected portion of the digital signature, a layout token 48A representing a geometric size of each visible signed UIC within a visual representation of electronic document 46 and a location of each visible signed UIC 50B relative to other visible signed UICs 50A or 50N in electronic document 46. Since, UIC 50B is visible and contained within a hierarchic UIC 50N, location conversion system 56 will first convert a location of the UIC 50B from a geometric location within the hierarchic UIC 50N to the geometric location within the visual representation prior to recording layout token 48A.

Thereafter, overlap system 62 of violation system 60 will determine if a UIC overlap violation is committed with respect to signed UIC 50B by an unsigned UIC such as UIC 50A. Under the present invention, a UIC overlap violation comprises one signed UIC and one unsigned UIC for which: the signed UIC 50B is not a hierarchic UIC 50N or the unsigned UIC 50A is not part of a signed hierarchic UIC 50N; and geometric regions on the visual representation occupied by the signed UIC 50B and the unsigned UIC 50A intersect by more than a predetermined overlap tolerance. If it is determined that an overlap violation does not exist, signature generation system 66 will formally generate the digital signature for UIC 50B. If however, an overlap violation was committed, signature generation system 66 could generate and output an error message or the like.

An additional feature of the present invention is to validate the digital signature after it has been generated (e.g., such as before user 44B attempts to make his/her signature). Specifically, overlap system 62 will once again determine if a UIC overlap violation has been committed (using the process outlined above), and layout system 64 will determine if a UIC layout violation has been committed. In general, a layout violation is committed if signed UIC 50B is obscured or un-obscured by another signed UIC. To this extent, layout system 64 will perform or have performed the following functions (e.g., by visibility system 54, location conversion system 56, and token recordation system 58): (1) determine whether UIC 50B is visible by combining local visibility information with visibility information of hierarchic UIC 50N containing UIC 50A; (2) convert a location of the UIC from a geometric location within hierarchic UIC 50N to a geometric location within a visual representation of the electronic document 46; and (3) generate a validation token 48B representing the converted geometric location and relative location of visible signed UIC 50B to other visible signed UICs in electronic document 46.

Once validation token 48B has been generated, it will be compared to layout token 48A to determine if a predetermined layout tolerance (e.g., obtained from an information source other than the portion of electronic document 46 that is not signed by the digital signature) is exceeded. If so, a UIC layout violation has been committed on UIC signed 50B by another signed UIC. It should be understood that although not shown in FIG. 3, electronic document 46 could include a switch hierarchic UIC. In such a case, layout system 64 will determine that a UIC layout violation has been committed if any switch hierarchic UIC of electronic document 46 changes cases after generation of the digital signature, except those switch hierarchies that are deemed mutable by notations in the electronic document 46 or the digital signature. If an overlap and/or layout violation is determined to have been committed, signature validation system 68 could generate and output an error message or the like.

Figure 4:
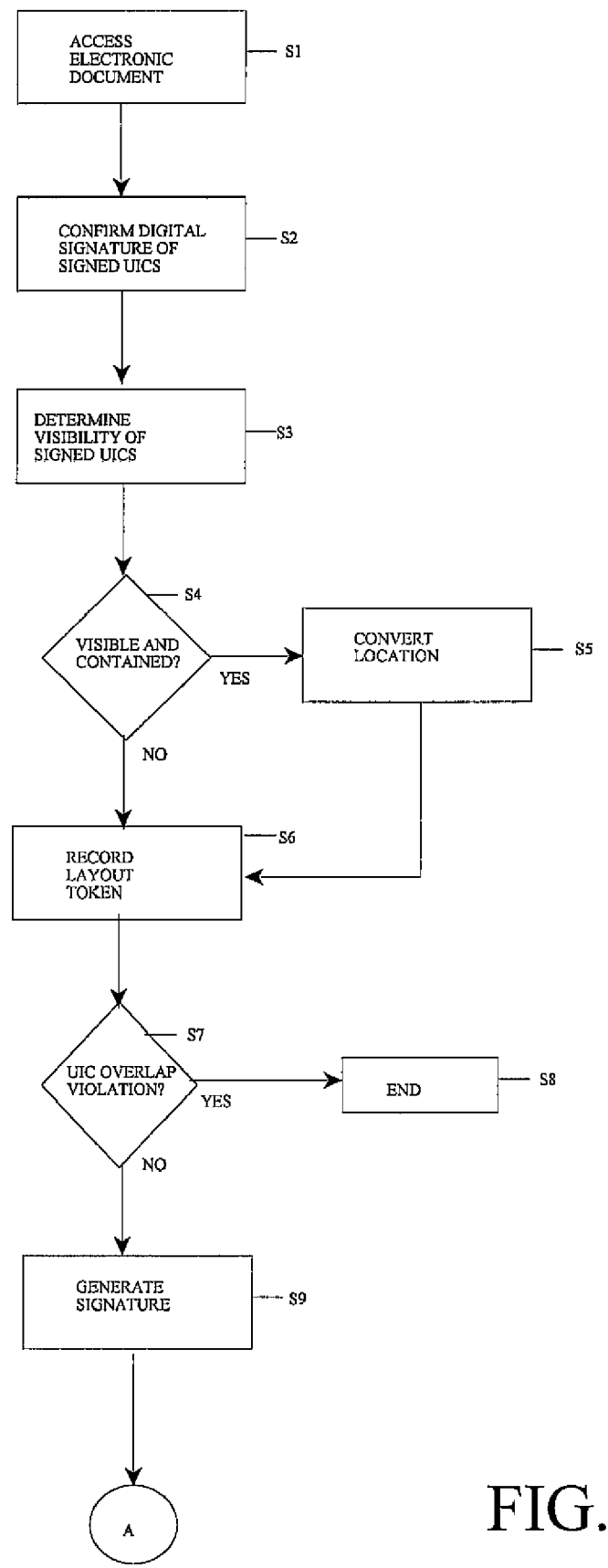
FIG. 4 depicts a method flow diagram according to the present invention.

Referring to FIG. 4, a method flow diagram according to the present invention is shown. As depicted, in step S1, an electronic document having at least one UIC is accessed. In step S2, each UIC in the electronic document is confirmed to be operationally classified as signed or unsigned by the digital signature based on whether the UIC is associated with a data node that is signed by the digital signature. In step S3, the visibility of all signed UICs is determined visible by combining local visibility information with visibility information of any hierarchic UIC containing the UIC. In step S4 it is determined if the signed UIC is visible and contained within a hierarchic UIC. If so, a location of the UIC is converted from a geometric location within the hierarchic UIC to the geometric location within the visual representation in step S5. Thereafter, a layout token representing a geometric location of each visible signed UIC within a visual representation of the electronic document and the locations of each visible signed UIC relative to other visible signed UICs in the electronic document is recorded within a cryptographically protected portion of the digital signature in step S6. In step S7 it is determine whether a UIC overlap violation has been committed. If so, the process is ended in step S7 (i.e., the digital signature is not generated). If no UIC overlap violation has been committed, the digital signature is generated in step S9.

Figure 5:
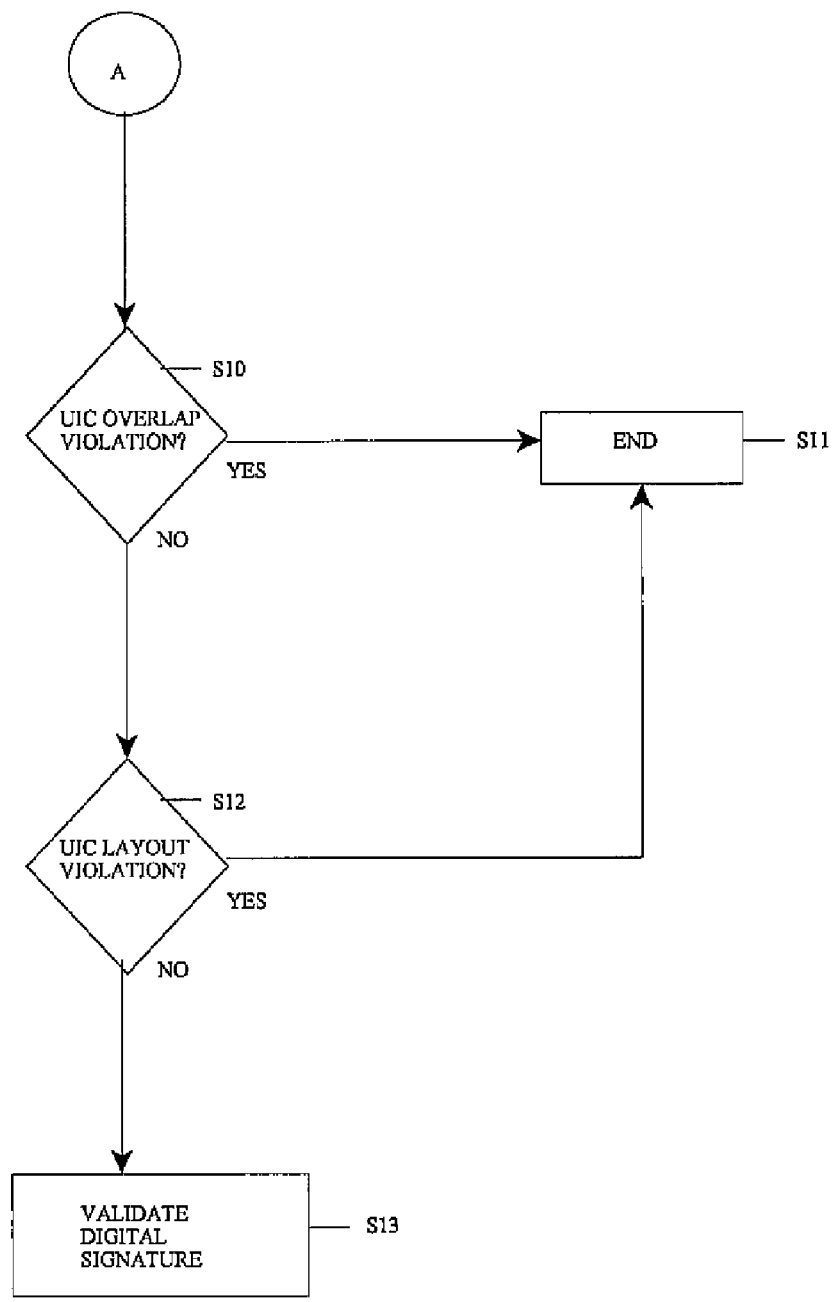
FIG. 5 depicts a continuation of the method flow diagram of FIG. 4.

After the digital signature has been generated, the process proceeds to flow A of FIG. 5 for validation thereof. Specifically, in step S10, it is again determined if an UIC overlap violation has been committed. If so, the process is ended in step S11 (i.e., the digital signature is not validated). If not, however, it is determined whether a UIC layout violation has been committed in step S12. If so, the process similarly ends in step S10. If, however, neither a UIC overlap violation nor UIC layout violation has been committed, the digital signature will be validated in step S13.

While shown and described herein as a method and system for generating and validating digital signatures, it is understood that the invention further provides various alternative embodiments. For example, in one embodiment, the invention provides a computer-readable/useable medium that includes computer program code to enable a computer infrastructure to generate and validate digital signatures. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer generate and validate digital signatures. In this case, the service provider can create, deploy, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for generating and validating digital signatures. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for generating digital signatures, comprising:
   accessing an electronic document having at least one user interface control (UIC) using a computer device;
   confirming, for each UIC, whether the UIC is operationally classified as signed by a digital signature being generated based on whether the UIC is associated with a data node that is included in the signed material of the signature;
   determining, for each signed UIC, whether the signed UIC is visible by combining local visibility information with a hierarchic UIC's visibility information, wherein said hierarchic UIC contains the signed UIC;
   converting the location of each visible UIC contained within any hierarchic UIC from a geometric location within any containing hierarchic UIC to the geometric location within the visual representation;
   recording, after the converting step, within a cryptographically protected portion of the digital signature a layout token, wherein the layout token represents a geometric size of each visible signed UIC within a visual representation of the electronic document and a location of each visible signed UIC relative to other visible signed UICs in the electronic document; and generating the digital signature unless a UIC overlap violation is committed.

2. The method of claim 1, further comprising determining if a UIC overlap violation is committed, wherein a UIC overlap violation comprises one signed UIC and one unsigned UIC for which:
   the signed UIC is not a hierarchic UIC or the unsigned UIC is not part of the signed hierarchic UIC; and
   geometric regions on the visual representation occupied by the signed UIC and the unsigned UIC intersect by more than a predetermined overlap tolerance.

3. The method of claim 2, further comprising generating a new digital signature in an electronic document that contains other digital signatures, wherein each UIC is confirmed to be operationally classified as signed or unsigned for the new digital signature being generated, and without regard for the signature information from any pre-existing digital signatures in the electronic document.

4. The method of claim 3, further comprising validating the digital signature by determining whether any signed or unsigned UIC commits at least one of: a UIC layout violation or a UIC overlap violation.

5. The method of claim 4, further comprising determining if a UIC layout violation is committed by:
   determining whether each signed UIC is visible by combining local visibility information with visibility information of any hierarchic UIC containing the UIC;
   converting the location of each visible signed UIC from a geometric location within any containing hierarchic UIC to a geometric location within a visual representation of the electronic document;
   recording a validation token representing a geometric size of each visible signed UIC within a visual representation of the electronic document and a location of each visible signed UIC relative to other visible signed UICs in the electronic document; and
   comparing the validation token to the layout token to determine if a predetermined layout tolerance is exceeded.

6. The method of claim 5, further comprising determining a UIC layout violation is committed if any switch hierarchic UIC of the electronic document changes cases after generation of the digital signature, except those switch hierarchic UICs that are deemed mutable by notations in at least one of the electronic document or the digital signature.

7. The method of claim 6, further comprising validating a particular digital signature in an electronic document that contains one or more other digital signatures, wherein each UIC is confirmed to be operationally classified as signed or unsigned for the particular digital signature being validated, and without regard to signature information from other digital signatures in the electronic document.

8. A system for generating digital signatures, comprising:
   a computer device including:
   a system for accessing an electronic document having at least one user interface control (UIC);
   a system for confirming, for each UIC, whether the UIC is operationally classified as signed by a digital signature being generated based on whether the UIC is associated with a data node that is included in the signed material of the signature;
   a system for determining, for each signed UIC, whether the signed UIC is visible by combining local visibility information with a hierarchic UIC's visibility information, wherein said hierarchic UIC contains the signed UIC;
   a system for converting the location of each visible UIC contained within any hierarchic UIC from a geometric location within any containing hierarchic UIC to the geometric location within the visual representation;
   a system for recording, after the converting step, within a cryptographically protected portion of the digital signature a layout token, wherein the layout token represents a geometric size of each visible signed UIC within a visual representation of the electronic document and a location of each visible signed UIC relative to other visible signed UICs in the electronic document; and
   a system for generating the digital signature unless a UIC overlap violation is committed.

9. The system of claim 8, further comprising a system for determining if a UIC overlap violation is committed, wherein a UIC overlap violation comprises one signed UIC and one unsigned UIC for which:
   the signed UIC is not a hierarchic UIC or the unsigned UIC is not part of the signed hierarchic UIC; and
   geometric regions on the visual representation occupied by the signed UIC and the unsigned UIC intersect by more than a predetermined overlap tolerance.

10. The system of claim 9, wherein the system for generating generates a new digital signature in an electronic document that contains other digital signatures, wherein each UIC is confirmed to be operationally classified as signed or unsigned for the new digital signature being generated, and without regard to signature information from any pre-existing digital signatures in the electronic document.

11. The system of claim 10, further comprising a system for validating the digital signature by determining whether any signed or unsigned UIC commits at least one of: a UIC layout violation or a UIC overlap violation.

12. The system of claim 11, further comprising a system for determining if a UIC layout violation is committed by:
    determining whether each signed UIC is visible by combining local visibility information with visibility information of any hierarchic UICs containing the UIC;
    converting the location of each visible signed UIC from a geometric location within any containing hierarchic UICs to a geometric location within a visual representation of the electronic document;
    recording a validation token representing a geometric size of each signed UIC within a visual representation of the electronic document and a location of each signed UIC relative to an other visible signed UICs in the electronic document; ad
    comparing the validation token to the layout token to determine if a predetermined layout tolerance is exceeded.

13. The system of claim 12, further comprising a system for determining a UIC layout violation is committed if any switch hierarchic UIC of the electronic document changes cases after generation of the digital signature, except those switch hierarchic UICs that are deemed mutable by notations in the electronic document or the digital signature.

14. The system of claim 13, further comprising a system for validating a particular digital signature in an electronic document that contains one or more other digital signatures generated, wherein each UIC is confirmed to be operationally classified as signed or unsigned for the particular digital signature being validated, and without regard for the signature information from other digital signatures in the electronic document.

15. A program product stored on a non-transitory computer readable storage medium for generating digital signatures, the computer readable medium comprising computer program code for causing a computer system to perform the following functions:

accessing an electronic document having at least one user interface control (UIC); confirming, for each UIC, whether the UIC is operationally classified as signed by a digital signature being generated based on whether the UIC is associated with a data node that is included in the signed material of the signature;

determining, for each signed UIC, whether the signed UIC is visible by combining local visibility information with a hierarchic UIC's visibility information, wherein said hierarchic UIC contains the signed UIC;

converting the location of each visible UIC contained within any hierarchic UIC from a geometric location within any containing hierarchic UIC to the geometric location within the visual representation;

recording, after the converting step, within a cryptographically protected portion of the digital signature a layout token, wherein the layout token represents a geometric size of each visible signed UIC within a visual representation of the electronic document and a location of each visible signed UIC relative to other visible signed UICs in the electronic document; and generating the digital signature unless a UIC overlap violation is committed.

16. The program product of claim 15, wherein the non-transitory computer readable storage medium further comprises program code to cause the computer system to perform the following additional function: determining if a UIC overlap violation is committed, wherein a UIC overlap violation comprises one signed UIC and one unsigned UIC for which:
the signed UIC is not a hierarchic UIC or the unsigned UIC is not part of the signed hierarchic UIC; and
geometric regions on the visual representation occupied by the signed UIC and the unsigned UIC intersect by more than a predetermined overlap tolerance.

17. The program product of claim 16, wherein the non-transitory computer readable storage medium further comprises program code to cause the computer system to perform the following additional function: generating a new digital signature in an electronic document that contains other digital signatures, wherein each UIC is confirmed to be operationally classified as signed or unsigned for the new digital signature being generated, and without regard for the signature information from any pre-existing digital signatures in the electronic document.

18. The program product of claim 17, wherein the non-transitory computer readable storage medium further comprises program code to cause the computer system to perform the following additional function: validating the digital signature by determining whether any signed or unsigned UIC commits at least one of: a UIC layout violation or a UIC overlap violation.

19. The program product of claim 18, wherein the non-transitory computer readable storage medium further comprises program code to cause the computer system to perform the following additional function: determining if a UIC layout violation is committed by:
determining whether each signed UIC is visible by combining local visibility information with visibility information of any hierarchic UIC containing the UIC;
converting the location of each visible signed UIC from a geometric location within any containing hierarchic UIC to a geometric location within a visual representation of the electronic document;
recording a validation token representing a geometric size of each signed UIC within a visual representation of the electronic document and a location of each signed UIC relative to other visible signed UICs in the electronic document; and
comparing the validation token to the layout token to determine if a predetermined layout tolerance is exceeded.

20. The program product of claim 19, wherein the non-transitory computer readable storage medium further comprises program code to cause the computer system to perform the following additional function: determining a UIC layout violation is committed if any switch hierarchic UIC of the electronic document changes cases after generation of the digital signature, except those switch hierarchic UICs that are deemed mutable by notations in the electronic document or the digital signature.

21. The program product of claim 20, wherein the non-transitory computer readable storage medium further comprises program code to cause the computer system to perform the following additional function: validating a particular digital signature in an electronic document that contains one or more other digital signatures, wherein each UIC is confirmed to be operationally classified as signed or unsigned for the particular digital signature being validated, and without regard to signature information from other digital signatures in the electronic document.

22. A method for deploying a system for generating digital signatures, comprising:
providing a computer infrastructure being configured to:
access an electronic document having at least one user interface control (UIC);
confirm, for each UIC, whether the UIC is operationally classified as signed by a digital signature being generated based on whether the UIC is associated with a data node that is included in the signed material of the signature;
determine, for each signed UIC, whether the signed UIC is visible by combining local visibility information with a hierarchic UIC's visibility information, wherein said hierarchic UIC contains the signed UIC;
convert the location of each visible UIC contained within any hierarchic UIC from a geometric location within any containing hierarchic UIC to the geometric location within the visual representation;
record, after the convert step, within a cryptographically protected portion of the digital signature a layout token, wherein the layout token represents a geometric size of each visible signed UIC within a visual representation of the electronic document and a location of each visible signed UIC relative to other visible signed UICs in the electronic document; and
generate the digital signature unless a UIC overlap violation is committed.

23. The method of claim 22, wherein the computer infrastructure is further operable to: determine if a UIC overlap violation is committed, wherein a UIC overlap violation comprises one signed UIC and one unsigned UIC for which:
the signed UIC is not a hierarchic UIC or the unsigned UIC is not part of the signed hierarchic UIC; and
geometric regions on the visual representation occupied by the signed UIC and the unsigned UIC intersect by more than a predetermined overlap tolerance.

24. The method of claim 23, wherein the computer infrastructure is further operable to: generate a new digital signature in an electronic document that contains other digital signatures, wherein each UIC is confirmed to be operationally classified as signed or unsigned for the new digital signature being generated, and without regard for the signature information from any pre-existing digital signatures in the electronic document.

25. The method of claim 24, wherein the computer infrastructure is further operable to validate the digital signature by determining whether any signed or unsigned UIC commits at least one of: a UIC layout violation or a UIC overlap violation.

26. The method of claim 25, wherein the computer infrastructure is further operable to determine if a UIC layout violation is committed by:
  determining whether each signed UIC is visible by combining local visibility information with visibility information of any hierarchic UIC containing the UIC;
  converting the location of each visible signed UIC from a geometric location within any containing hierarchic UIC to a geometric location within a visual representation of the electronic document;
  recording a validation token representing a geometric size of each signed UIC within a visual representation of the electronic document and a location of each signed UIC relative to other visible signed UICs in the electronic document; and
  comparing the validation token to the layout token to determine if a predetermined layout tolerance is exceeded.

27. The method of claim 26, wherein the computer infrastructure is further operable to determine a UIC layout violation is committed if any switch hierarchic UIC of the electronic document changes cases after generation of the digital signature, except those switch hierarchic UICs that are deemed mutable by notations in the electronic document or the digital signature.

28. The method of claim 27, wherein the computer infrastructure is further operable to validate a particular digital signature in an electronic document that contains one or more other digital signatures, wherein each UIC is confirmed to be operationally classified as signed or unsigned for the particular digital signature being validated, and without regard to signature information from other digital signatures in the electronic document.

* * * * *